United States Patent Office 3,268,041
Patented August 23, 1966

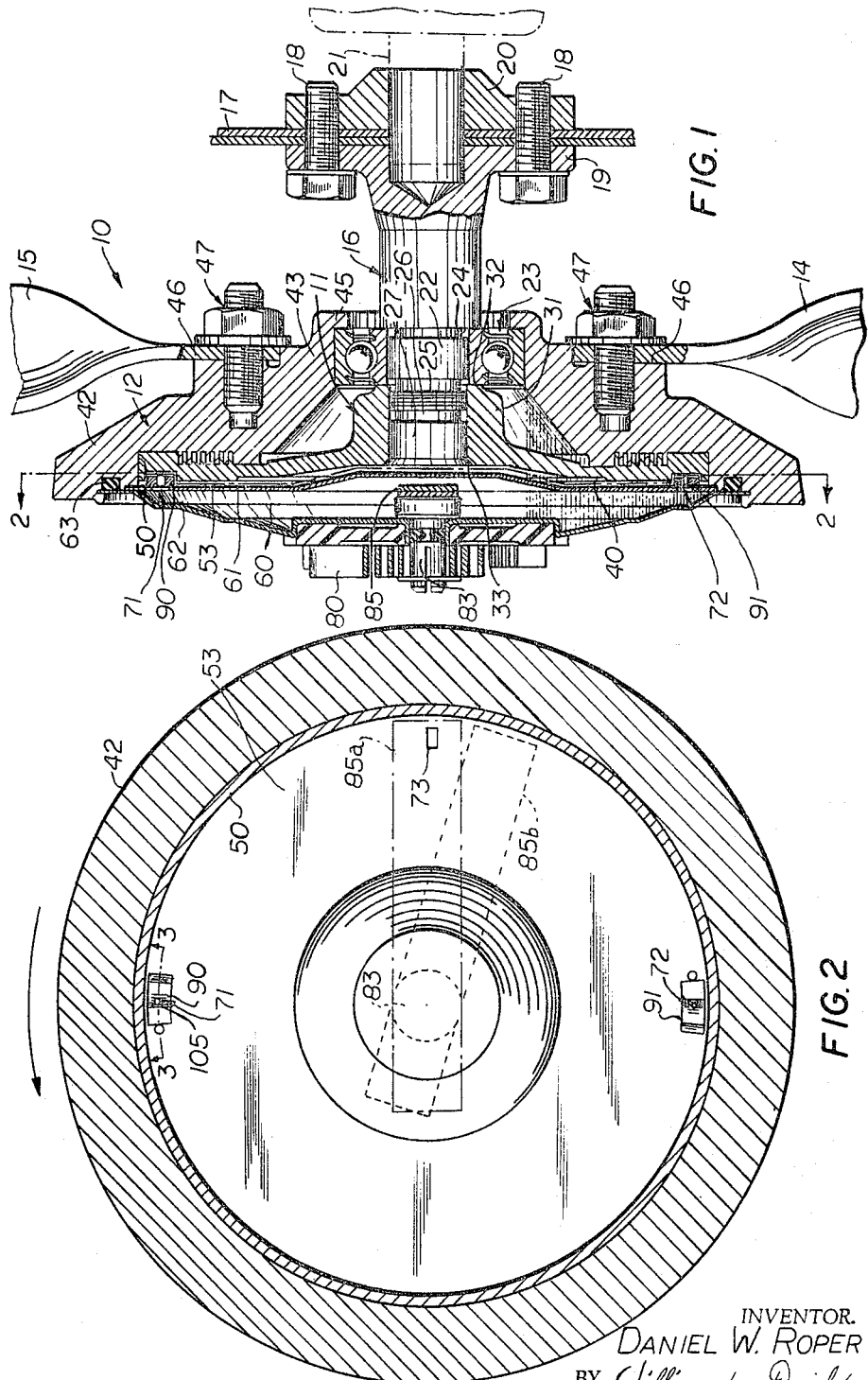

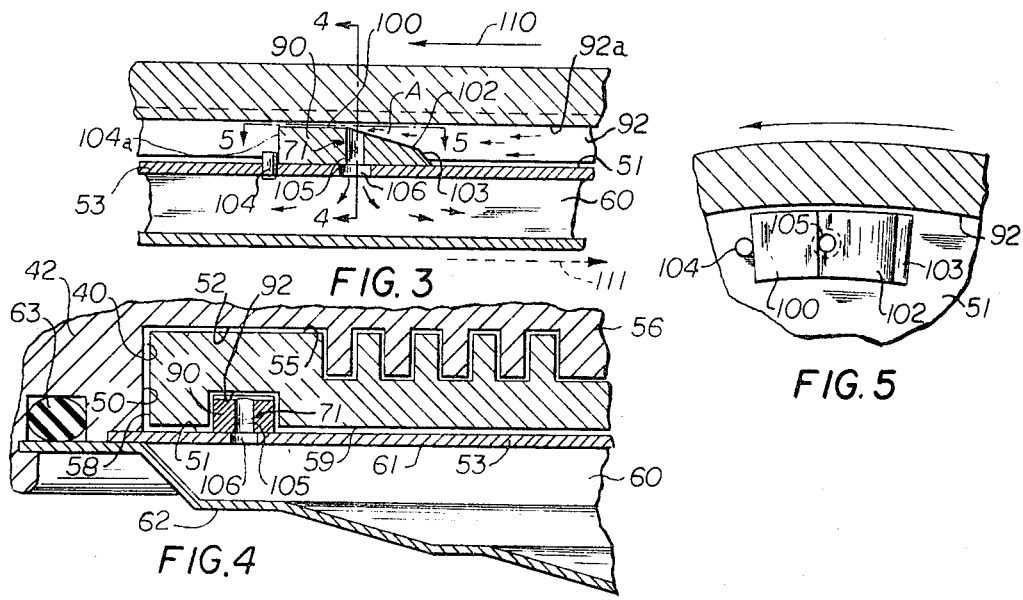
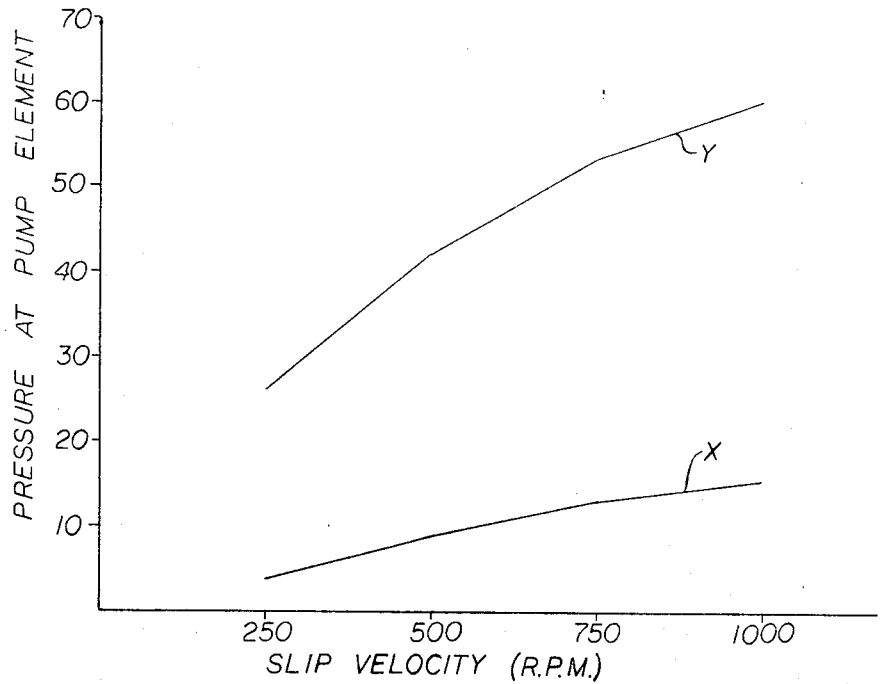

3,268,041
VISCOUS DRIVE
Daniel W. Roper, Rochester, Mich., assignor to Eaton
Yale & Towne, Inc., a corporation of Ohio
Filed July 23, 1964, Ser. No. 384,703
16 Claims. (Cl. 192—58)

This invention relates to fluid couplings of the type embodying a fluid medium for transmitting torque between relatively rotatable input and output coupling members and, particularly, to a shear type fluid coupling wherein the amount of fluid in the operating chamber transmitting torque between the rotatable coupling members can be varied to vary the speed of the output member.

Fluid couplings of the above-noted type are usable for driving various different types of load devices, and have particular utility for driving an engine accessory, such as a cooling fan device of an internal combustion engine. Known fluid couplings constructed to provide fan drives include a means for varying the volume of fluid medium transmitting torque between the input and output coupling members so that when fan cooling requirements are decreased, the amount of fluid transmitting torque is decreased and the speed differential between the input and output members is increased due to the decrease in the volume of the operating fluid medium transmitting torque. Conversely, when the cooling requirements are increased, the volume of fluid is increased and the speed differential between the input and output members is decreased. United States Patent No. 3,055,473 discloses a fluid coupling of the above-noted type.

The decrease and increase of the volume of operating fluid medium transmitting torque between the coupling members in the known fluid couplings is effected by means of a suitable structure including a pumping mechanism which is incorporated in the fluid coupling. The pumping mechanism includes a pumping element which extends into the chamber for the fluid medium and functions to effect a decrease or an increase in the volume of fluid in the operating chamber between the input and output coupling members. The pumping mechanisms utilized in the known fluid couplings to decrease the volume of fluid medium in the operating chamber have been relatively ineffective at low slip rates.

Accordingly, the principal object of the present invention is the provision of a new and improved fluid coupling constructed so that the fluid in the operating chamber can be evacuated therefrom at extremely low rates of slip between the coupling members.

A further object of the present invention is the provision of a new and improved fluid coupling having a pumping element for evacuating the fluid from the operating chamber and which is constructed and arranged so as to be relatively insensitive to viscosity of the fluid in the pumping chamber.

A still further object of the present invention is the provision of a new and improved fluid coupling wherein fluid is evacuated from the operating chamber by building up a pressure in the operating chamber ahead of a pumping element which extends into the operating chamber and wherein the pressure built up ahead of the pumping element is extremely high at a given slip rate as compared to the prior art.

Another object of the present invention is the provision of a new and improved fluid coupling, as noted in the preceding object, wherein the pumping element is supported on an output coupling member and located in an annular channel in an input coupling member and constructed so as to provide a hydrodynamic fluid pressure ahead of the pumping element in the channel.

Still another object of the present invention is the provision of a new and improved fluid coupling, as noted in the preceding object, wherein the pumping element is a wedge-shaped member which is mounted on the output coupling member and defines a chamber with the adjacent surface of the input coupling member, which chamber has an acute angle, and wherein a fluid conduit opening is provided interconnecting the apex portion of the chamber with a reservoir chamber carried by the output coupling member.

Further objects and advantages and novel characteristics of the present invention will be apparent from the following detailed description of a preferred embodiment thereof made with reference to the accompanying drawings forming a part of this specification and in which:

FIG. 1 is an axial sectional view of a fluid coupling embodying the present invention;

FIG. 2 is a transverse sectional view of the fluid coupling of FIG. 1, taken approximately along the section line 2—2 of FIG. 1;

FIG. 3 is a fragmentary sectional view of a portion of the fluid coupling shown in FIG. 2, taken approximately along section line 3—3 of FIG. 2;

FIG. 4 is a fragmentary vertical sectional view of the fluid coupling shown in FIG. 3, taken approximately along the section line 4—4 of FIG. 3;

FIG. 5 is a fragmentary sectional view of the fluid coupling of FIG. 3, taken approximately along the section line 5—5 of FIG. 3; and FIG. 6 is a graph illustrating the characteristics of the fluid coupling of the present invention.

The present invention provides in general a fluid coupling wherein a viscous shear fluid medium cooperates with input and output coupling members to transmit torque therebetween and wherein the volume of the fluid medium cooperating with the input and output members can be varied to vary the torque transmitted to the output member. As representing the preferred embodiment of the present invention, a fluid coupling 10 is shown in the drawings. The fluid coupling 10 includes an input coupling member 11 and an output coupling member 12. The coupling 10 is here shown as a drive for an engine accessory and specifically is a drive for a radiator cooling fan device. It is to be understood, however, that the novel construction of the preferred embodiment of the present invention is not limited to an application to a fan drive but is usable in any application wherein the torque transmission characteristics of a fluid drive are desired along with means to vary the speed differential between the input and output coupling members by varying the amount of the fluid medium transmitting torque between the coupling members.

Referring to the drawings more specifically, FIG. 1 shows a cooling fan engine accessory including fan blades 14, 15 which are driven from the engine through the fluid coupling 10. The fluid coupling 10 includes an input shaft 16 on which the input member 11 is mounted and which is rotatable as by a belt drive including a pulley member 17, only a portion of the latter being shown in the drawings. The pulley member 17 is connected to the input shaft 16 at one end thereof by suitable screws 18 which extend through flange portion 19 on the end of the shaft 16 and through openings in the pulley member. The screws 18 are threaded into a hub plate 20 located on the side of the pulley 17 opposite from the flange portion 19 and are effective to clamp the pulley between flange portion 19 and hub plate 20. The hub plate 20 is suitably mounted on a stub shaft 21 which is rotatably supported by the engine block.

The input shaft 16 has intermediate its ends a reduced shaft portion 22 functioning as a support for the inner race of ball bearing assembly 23. A shoulder 24 on the shaft 16 prevents movement of the ball bearing assembly 23 in one axial direction, namely, to the right as viewed in FIG. 1. Another shaft portion 25 is provided with surface serrations and a reduced diameter portion 26 connects shaft portion 25 with a further shaft portion 27, at the end of shaft 16 opposite the end having the flange portion 19.

The rotatable input or driving member 11 of the fluid coupling 10 is in the form of a disk having a hub portion 31 supported by shaft 16. The hub portion 31 has an opening therethrough which has an interference fit with the shaft portions 25 and 27. The hub portion 31 is pressed onto the shaft 16 until the inner surface 32 of the hub 31 abuts the side of the inner race of the ball bearing assembly 23 and thus prevents movement of the ball bearing assembly 23 to the left, as viewed in FIG. 1. The outboard end of shaft portion 27 is flared over at 33 to positively retain coupling member 11 in assembly with input shaft 16. From the above description, it should be apparent that the rotation of the shaft 16 causes the input coupling member 11 to be rotated.

The input coupling member 11 rotates in a fluid working or operating chamber 40 having a generally cylindrical shape and formed by the rotatable output or driven coupling member 12. The output coupling member 12 is in the form of a housing and includes a main housing member 42 having a hub portion 43 with an opening therethrough. The opening has an interference fit with the outer race of the ball bearing assembly 23 and is supported thereby for rotation about the axis of the shaft 16. A flange portion 45 engages the right side of the outer race of the ball bearing assembly 23, as viewed in FIG. 2, and restrains housing member 42 from movement in one axial direction. The fan blades 14 and 15 are secured to surface portions 46 of the housing member 42 by stud and nut assemblies 47 so as to rotate with the housing member 42. The housing member 42 also preferably includes a plurality of fins for cooling the coupling 10.

Referring now to FIG. 4, the working chamber 40 formed by the output member 12 is defined by a cylindrical surface 50 coaxial with the shaft 16 and by end surfaces 51, 52. The cylindrical surface 50 is provided by a bore in the housing member 42, and the end surface 52 is located at the bottom of the bore. The end surface 51 of the chamber 40 is provided by a partition member 53 in the form of a disk which extends radially of the shaft 16, and the peripheral edge of which is secured to the housing member 42.

The input member 11 which rotates in the working chamber 40 has a surface portion 55 spaced from the surface 52 of the housing member 42. The surface portion 55 of the input disk member 11 and the surface 52 of the housing member 42 have a cooperating plurality of grooves and lands therein which are designated generally 56 in the drawings. These grooves and lands provide opposed surfaces extending in close parallel face-to-face relation and have an intervening shear space therebetween. Upon rotation of the disk 11, the fluid in the fluid operating chamber 40 transmits torque from the disk member 11 to the housing member 42, and specifically the fluid in the above-mentioned shear spaces transmits torque between the input and output members by the shear action of the fluid.

The radially outermost surface portion 58 of the disk 11 cooperates with the surface 50 to also provide an intervening shear space therebetween so that when fluid is positioned therebetween, transmission of the torque from the disk member 11 to the housing member 42 is effected. Moreover, the forwardmost surface portion 59 of the disk member 11 cooperates with the surface 51 of the partition member 53 which is spaced therefrom to provide a shear space therebetween to transmit torque between the coupling members when fluid is positioned therebetween.

The amount of torque transmitted from the disk member 11 to the coupling member 12 is a function of the volume of fluid in the chamber 40 and, specifically, in the above-mentioned shear spaces. In the event fluid is not located in any of the shear spaces, no torque is transmitted between the input and output members. It should be apparent from the above description that, if there is no fluid in the chamber 40, and, consequently, no fluid in the shear spaces, there would be no transmission of torque between the input and output members, and as the amount of fluid in the chamber 40 increases, an increasing amount of torque is transmitted between the input and output members and the speed differential between the members is decreased.

In order to vary the volume of fluid in the chamber 40 and thus vary the torque transmitted and the speed differential between the input and output members, the fluid coupling 10 includes a means providing for flow of fluid into and from the chamber 40. The fluid supplied to the chamber 40 flows thereinto from a fluid reservoir or storage chamber 60, and the fluid leaving the chamber 40 flows back into the reservoir or storage chamber 60. The reservoir chamber 60 is adjacent working chamber 40 and is formed by the output member 12. The chamber 60 is defined by surface 61 of the partition member 53 which is on the side thereof opposite surface 51, and by a generally circular dish-shaped cover member 62 which forms a portion of the output member 12. The outer peripheral edge of the cover member 62 is secured to the housing member 42 and a suitable sealing ring 63 is positioned therebetween to prevent fluid leakage therebetween.

The mechanism to effect fluid flow between the reservoir chamber 60 and working chamber 40 is operable when fan cooling is not required to effect fluid flow from the working chamber 40 into the reservoir chamber 60 through passageways 71, 72 to thereby increase the speed differential between input member 11 and output member 12. When fan cooling is required, the mechanism allows for fluid flow into the working chamber 40 from the reservoir chamber 60 through opening 73 in the partition member 53 to increase the torque transmitted between the input and output members, as will be apparent from the description below. A plurality of passages, not shown, are provided extending through the input member 11 and are located radially outwardly of the lands and grooves 56 and function to direct fluid between the opposite sides of the input member when fluid flows into the working chamber 40 and when it flows from the working chamber 40. A plurality of radially extending V-shaped grooves are also preferably provided across the lands and grooves and facilitate flow of fluid radially into the area of the projections defining the lands and grooves.

The mechanism to effect flow between the chambers includes a helically wound bimetallic temperature responsive coil means 80 supported by the cover member 62. One end of the helically wound bimetallic temperature responsive coil means is selectively positioned between retaining means formed on the cover member 62 and the other end is positioned in a slot formed in a stub shaft 83 rotatably supported by the cover member 62 coaxial with shaft 16. One end of the shaft 83 extends into the reservoir chamber 60, and the other end of the stub shaft 83 receives the end of the bimetallic coil 80 and is pinched together so as to hold the end of helically wound coil 80 onto the stub shaft. An arm member 85 is suitably secured to the end of the stub shaft 83 which extends into the reservoir chamber 60 for rotation therewith. The arm member 85 extends sufficiently to cover opening 73 in the partition member 53 and is moved upon changes in temperature between its dot-dash position 85a covering opening 73 and its dash-dash position 85b wherein it does not cover opening 73, as shown in FIG. 2.

The coil 80 expands or contracts upon changes in temperature, depending upon whether there is an increase or decrease in the temperature. When the coil 80 expands or contracts, it rotates the shaft 83 and also rotates the arm member 85 between its positions 85a, 85b. Upon a temperature increase, the coil 80 expands and causes rotation of the member 85 to its position 85b, in which position, arm member 85 does not cover or block opening 73 in the partition member. Upon a reduction in temperature, the coil 80 contracts and the arm member 85 is moved thereby to position 85a. When arm member 85 is in position 85b, it allows for the flow of fluid through the opening 73 in the partition member 53, and fluid then flows from the reservoir chamber 60 into the working chamber 40. At intermediate positions of the arm member 85, a certain amount of fluid flows into the working chamber 40, depending upon the amount of opening 73 that is unblocked.

Fluid flow is effected from the working chamber 40 into the reservoir chamber 60 through the fluid passageways 71, 72 by a pair of pumping or impact elements 90, 91, respectively, supported by the partition member 53. The pumping elements 90, 91 project into the working chamber 40 and are positioned in the working chamber radially outwardly of the interfitting projections defining the lands and grooves 56 and are diametrically opposed. The pumping elements 90, 91 extend into the annular channel or raceway 92 formed in the input coupling member 11 opposite the side of the input coupling member carrying the cooperating lands and grooves. The pumping elements 90, 91 of the present invention have been constructed to take maximum advantage of the inherent operation of the fluid coupling. The pumping elements 90, 91 are of identical construction and only pumping element 90 will be described hereinbelow in detail.

The pumping element 90 is of sufficient cross section to substantially block channel 92 in the input coupling member. The pumping element 90 has a surface 100 thereon spaced slightly from the bottom 92a of the raceway or channel 92 in the input coupling member. The surface 100 is a substantially planar surface and extends radially of the axis of the coupling member 11 and substantially parallel with the bottom 92a of the channel 92. The pumping element 90 also includes a surface 102 which intersects the surface 100 and which extends away from the surface 100 toward the partition member 53 of the output coupling member 12 and away from the input coupling member 11 in a direction opposite the direction of rotation of the coupling members.

The surface 102 forms an acute angle, designated A in the drawings, with the bottom 92a of the channel 92 and defines therebetween a chamber having an angular configuration and having an apex adjacent the intersection of the surfaces 100, 102. The size of the angle A may vary, but preferably is in the range of 5 to 30 degrees. A further surface 103 of the pumping element intersects the surface 102 and extends downwardly therefrom and in a direction opposite the direction of rotation of the coupling members toward the partition member 53 and intersects the surface of the pumping member 90 which is positioned adjacent and lies against the inner surface 51 of the partition member 53. It can be seen, therefore, that the pumping element 90 defines a chamber with the bottom 92a of the channel 92, which chamber decreases in cross section as it extends in the direction of rotation of the coupling members. The pumping element may be secured in the above-described position in any suitable manner. A small clamp, not shown, may engage a part of the pumping element and be secured to the output member to secure the pumping element to the output member. Preferably, a pin member 104 is positioned to bear against the surface 104a of the pumping element. The surface 104a of the pumping element is the surface of the side opposite the angle A in which the pressure is built up by the action of the pumping element.

The pumping element 90 is provided with an opening 105 which extends axially of the coupling member 12 and forms a portion of the passageway 71. The opening 105 communicates with the channel 92 at a point adjacent to the apex of the angle A defined by the bottom surface 92a of the channel 92 and the surface 102. The passageway 105 communicates with an opening 106 in the partition member 53 so as to conduct fluid from the apex defined by the surface 102 and the bottom surface 92a of the channel into the reservoir chamber 60.

The operation of the fluid coupling 10 should be apparent. When the input and output coupling members 11 and 12 are at rest, the fluid in the chambers 40 and 60 drains to the lower portion of the coupling as shown in FIG. 1. As the coupling member 11 begins to rotate, the fluid is dragged thereby around the working chamber 40 and effects rotation of the output coupling member 12. The centrifugal force provided by the rotation of the coupling members distributes the fluid radially outwardly in the chambers 40, 60. During operation, the fluid flow into the working chamber 40 from the reservoir chamber 60 is controlled by the position of the member 85 as described. The flow from the working chamber 40 into the reservoir chamber 60 is effected by the pumping elements 90, 91.

The pumping elements 90, 91 effect flow from the working chamber 40 by establishing a relatively high pressure adjacent thereto, and specifically adjacent the opening 105, which is greater than the pressure in the reservoir chamber 60. This pressure which is created is due to the inherent mode of operation of the coupling mechanism. The coupling members 11, 12 rotate in the direction of the full line arrow 110 shown in FIG. 3. The input coupling member 11 rotates at a faster rate than the output coupling member 12. Thus, the direction of rotation of the output coupling member relative to the input coupling member 11 is indicated by the dot-dash arrow 111 in FIG. 3. Because of this relative rotation of the coupling members, a pressure is built up in the channel 92 and specifically in the area of the apex of angle A resulting in flow therefrom into the chamber 60. The flow of fluid in the channel 92, of course, is in the direction of the arrows shown in FIG. 3 and substantially in a circumferential direction, while the flow through the opening 105 is in an axial direction.

It has been found that the construction of the pumping elements 90, 91 as shown in the drawings and described above, has provided for an extremely efficient and effective viscous coupling. The pressure in the apex of the angle A, defined by the surface 102 and the bottom surface 92a of the channel 92 in which the pumping element is located, is a hydro-dynamic pressure which is produced by the pumping elements 90, 91 in cooperation with the channel 92 and the input and output coupling members 11, 12. It has been found that the pressure in this area is quite high as compared to the pressures adjacent the pumping elements in the known art. An adequate pressure is provided even at relatively low rates of slip between the coupling members 11, 12 and, as a result, the coupling 10 of the present invention may be evacuated at lower slip rates than those of the prior art. Moreover, the rate of evacuation can be substantially increased over those of the prior art, in view of the fact that the pressure in the apex A is substantially greater than the pressure in advance of the normal pumping elements when other conditions are substantially the same.

A graph forming FIG. 6 illustrates that the pressures are substantially greater in the coupling of the present construction. The graph of FIG. 6 shows a curve X of pressure versus slip rate of the coupling of the present invention. The curves X and Y are for couplings utilizing a fluid shear medium of substantially the same viscosity. The pressures in the present coupling are substantially greater. It has been found that the pressures under certain conditions may be up to 10 times as great as in the known couplings.

Moreover, it has been found that the pumping elements 90, 91 as shown in the drawings are less viscosity sensitive in that the pressure adjacent thereto increases with increases in viscosity of the shear fluid and it is believed that even at a relatively high viscosity, the fluid pressure will not be decreased, as occurs in known prior art couplings. Moreover, it has also been found that the viscous coupling of the present invention is less affected by the amount of fluid in the pumping channel 92.

The above-described improved operating characteristics of the fluid coupling of the present invention are believed to indicate that the pressure adjacent the pumping elements 90, 91 is a function of the frictional force between the viscous fluid and the input member being exerted against the pumping elements 90, 91. Heretofore, this pressure build-up was believed to be a result of the conversion of a velocity head into a static pressure head. The particular construction of the pump elements, as described hereinabove, takes into consideration this change in theory, and the pumping elements 90, 91 do function to provide a hydrodynamic pressure between the rotating coupling members and provide an improved coupling.

From the above description, it should be readily apparent that the applicant herein has provided a highly improved fluid coupling. Moreover, it should be apparent that the fluid coupling of the preferred embodiment has been described and shown hereinabove in considerable detail and that certain modifications, changes, and adaptations may be made therein, and it is hereby intended to cover all such modifications, changes, and adaptations therein coming within the scope of the appended claims.

Having described my invention, I claim:

1. A fluid coupling comprising a rotatable input coupling member, a rotatable output coupling member disposed adjacent the input member, said input and output coupling members having spaced opposed surface portions defining a fluid shear space therebetween cooperable with a fluid shear medium within said shear space to provide a shear type fluid drive between said members, a fluid reservoir chamber adjacent said shear space, means providing fluid conducting means communicating said fluid reservoir chamber with said shear space, said fluid conducting means providing for fluid flow between said shear space and said fluid reservoir chamber, and a pumping element supported by said output coupling member and effective to produce a fluid flow from said shear space into said reservoir chamber through said fluid conducting means, said pumping element comprising a wedge-shaped member having a first surface forming an acute angle with a second surface on the input coupling member and tapered away from said second surface in a direction opposite the direction of rotation of the input coupling member.

2. A fluid coupling as defined in claim 1 wherein said output coupling member defines a fluid working chamber in which said input coupling member rotates and said pumping element projects into said working chamber with said second surface of the input coupling member extending radially thereof.

3. A fluid coupling as defined in claim 2 wherein said fluid conducting means comprises a fluid passageway interconnecting said working chamber and said reservoir chamber including in part a conducting passage portion extending through said pumping element and communicating with said working chamber at the apex of the angle defined by said tapered surface of said pumping element and the adjacent surface of the rotable coupling input member.

4. A fluid coupling comprising a first rotatable coupling member, a second rotatable coupling member disposed adjacent the first rotatable member, said first and second rotatable members having spaced opposed surface portions defining a fluid shear space therebetween cooperable with a fluid shear medium within said shear space to provide a shear type fluid drive between said members, a fluid reservoir chamber adjacent said shear space, means providing fluid conducting means communicating said fluid reservoir chamber with said shear space, said fluid conducting means providing for fluid flow between said shear space and said reservoir chamber, and pumping means supported on one of said members and having a first surface adjacent a second surface of the other of said members and defining therebetween a chamber of decreasing cross-sectional dimension as the chamber extends in the direction of rotation of the coupling members.

5. A fluid coupling as defined in claim 4 wherein said first surface is tapered away from said second surface in a direction opposite the direction of rotation of the coupling members and defines an angular shaped chamber therebetween.

6. A fluid coupling comprising an input coupling member, an output coupling member disposed adjacent the input coupling member, said input and output coupling members having spaced opposed surface portions defining a fluid shear space therebetween and cooperable with a fluid shear means within the shear space to provide a shear type fluid drive between said members, a fluid reservoir chamber adjacent said shear space, said input coupling member having an annular channel extending axially thereinto from one radial surface thereof, means providing for fluid flow between said shear space and said reservoir chamber including a pumping element supported on said output coupling member and extending into said annular channel and having a surface portion tapered away from the bottom radially extending surface of said channel in a direction opposite the direction of rotation of the coupling members.

7. A fluid coupling as defined in claim 6 wherein said pumping element comprises a wedge-shaped member and said surfaces define an angular chamber and said wedge-shaped member includes an opening communicating with the reservoir chamber and a portion of the channel adjacent to the apex of said chamber.

8. A fluid coupling comprising an input coupling member and an outlet coupling member disposed adjacent the input coupling member, said input and output coupling members having spaced opposed surface portions defining a fluid shear space therebetween cooperable with a fluid shear medium within the shear space to provide a shear type fluid drive between said members, means for evacuating fluid from said shear space including pumping means supported by said output coupling member and having a surface portion adjacent a surface of said input coupling member and defining therebetween a chamber of decreasing cross-sectional dimension as the chamber extends in the direction of rotation of the coupling members.

9. A fluid coupling comprising a first rotatable coupling member, a second rotatable coupling member disposed in a working chamber defined by said first rotatable coupling member, said first and second rotatable coupling members having spaced opposed surface portions defining a fluid shear space therebetween cooperable with a fluid shear medium within the shear space to provide a shear type fluid drive between said members, a fluid reservoir chamber adjacent the working chamber, means providing for fluid flow between said working chamber and said reservoir chamber including a pumping means for producing a hydrodynamic pressure between said pumping means and opposing portions of said working chamber and means communicating the area of said working chamber at said hydrodynamic pressure with said reservoir chamber.

10. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure between said pumping element and said annular channel adjacent thereto, and means providing a fluid passageway communicating said portion of said channel at said hydrodynamic pressure with the reservoir chamber.

11. A fluid coupling comprising an input coupling member, an output coupling member disposed adjacent the input coupling member, said input and output coupling members having opposed spaced surface portions defining a fluid shear space therebetween and cooperable with a fluid shear medium within the shear space to provide a shear type fluid drive between said members, a fluid reservoir chamber adjacent said shear space, said input coupling member having an annular channel extending thereinto and opening adjacent a portion of said output coupling member, means providing fluid flow between said shear space and said reservoir chamber including a pumping element supported on said output coupling member and extending into said annular channel and having a surface portion tapered away from the surface portion defining said channel and remote from said output coupling member in a direction opposite the direction of rotation of the coupling members.

12. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure in said annular channel adjacent thereto, and means providing a fluid passageway communicating said portion of said channel at said hydrodynamic pressure with the reservoir chamber, and said pumping element comprising a wedge-shaped member having a surface which tapers away from the bottom radially extending surface of said channel in a direction opposite the direction of rotation of the coupling members.

13. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure in said annular channel adjacent thereto, and means providing a fluid passageway communicating said portion of said channel at said hydrodynamic pressure with the reservoir chamber, said pumping element having a surface defining a chamber between the pumping element and the bottom radially extending surface of said annular channel, which chamber decreases in cross-sectional dimension as the chamber extends in the direction of rotation of the coupling members.

14. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure in said annular channel adjacent thereto, and means providing a fluid passageway communicating said portion of said channel at said hydrodynamic pressure with the reservoir chamber, said pumping element comprising a wedge-shaped member having a surface defining an angular chamber with the bottom radially extending surface of the annular channel and said fluid passageway comprises a passageway formed in said pumping element and communicating with the apex of said angular chamber.

15. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure in said annular channel adjacent thereto, means providing a fluid passageway communicating said portion of said channel at said hydrodynamic pressure with the reservoir chamber, and means engageable with a portion of said pumping element opposite the portion of the pumping element adjacent the hydrodynamic pressure for maintaining the pumping element in position on the output coupling member.

16. A fluid coupling comprising an output coupling member, an input coupling member disposed in a working chamber defined by said output coupling member, said input and output coupling members having spaced opposed surface portions defining a fluid shear space therebetween cooperable with a fluid shear medium in said shear space to provide a shear type fluid drive between said members, a fluid reservoir chamber adjacent said working chamber, said input coupling member having an axially extending annular channel intersecting one radially extending surface thereof, a pumping element supported on said output coupling member and projecting into said annular channel and providing a hydrodynamic pressure in said annular channel adjacent thereto, and means providing a fluid passageway communicating said portion of said channel at said hydrodynamic pressure with the reservoir chamber, said pumping element comprising a wedge-shaped member having a surface defining an angular chamber with the bottom radially extending surface of the annular channel and said fluid passageway comprises a passageway formed in said pumping element and communicating with the apex of said angular chamber, the angle of the apex of said angular chamber is in the range of 5 to 30 degrees.

References Cited by the Examiner

UNITED STATES PATENTS 3,174,600 3/1965 Oldberg _____ 192—58
3,191,733 6/1965 Weir _____ 192—58

DAVID J. WILLIAMOWSKY, *Primary Examiner.*

DON A. WAITE, *Examiner.*

A. McKEON, *Assistant Examiner.*